United States Patent
Emmett, Jr. et al.

[15] 3,698,556
[45] Oct. 17, 1972

[54] APPARATUS FOR STEAM DRYING FILTER CAKE

[72] Inventors: Robert C. Emmett, Jr., East Dundee, Ill.; Donald A. Dahlstrom; John C. Brozovich, both of Salt Lake City, Utah

[73] Assignee: Envirotech Corporation, Salt Lake City, Utah

[22] Filed: Oct. 30, 1970

[21] Appl. No.: 85,321

[52] U.S. Cl. ............................................. 210/178
[51] Int. Cl. ........................................... B01d 35/18
[58] Field of Search ...................... 210/68, 178, 179

[56] References Cited

UNITED STATES PATENTS

| | | |
|---|---|---|
| 3,361,259 | 1/1968 | Von Der Gathen et al. ..................210/68 X |
| 3,191,314 | 6/1965 | Flournoy .................210/68 X |
| 3,122,528 | 2/1964 | Hanesworth.............210/68 X |

Primary Examiner—Reuben Friedman
Assistant Examiner—F. F. Calvetti
Attorney—Stowell & Stowell

[57] ABSTRACT

Apparatus is disclosed for steam drying filter cake formed on a drum or disc vacuum filter mounted for rotation in a container the lower portion of which comprises a feed slurry tank and the upper portion comprises a steam hood or steam dome. Means are provided to control the distribution of steam to the dome; to provide releasable seals for the rotary filter; to provide an improved steam hood; to provide exhaust means for the device and to provide an air cooler for the formed and heated filter cake.

14 Claims, 18 Drawing Figures

FIG. 1

INVENTOR
ROBERT C. EMMETT JR.
DONALD A. DAHLSTROM
JOHN C. BROZOVICH

BY *Howell & Howell*

ATTORNEY

APPARATUS FOR STEAM DRYING FILTER CAKE

Related subject matter is disclosed and claimed in U.S. Pat. applications, Ser. Nos. 86,180 and 85,488, METHOD FOR STEAM DRYING FILTER CAKE, Emmett and Dahlstrom, filed even date herewith, and U.S. Pat. application, Ser. No. 692 now U.S. Pat. No. 3,592,341, filed January 5, 1970 entitled METHOD AND APPARATUS FOR STEAM DRYING FILTER CAKE.

BACKGROUND OF THE INVENTION

This invention relates generally to pressure differential filtration and in particular to filtration wherein a relatively drier filter cake is obtained by passing steam, during the drying cycle, through the filter cake formed on the filter.

The use of steam as an aid in reducing moisture content of filter cake is known in the art. It is further known to construct rotary drum and rotary disc vacuum filters with a steam dome or hood whereby during at least a portion of the drying cycle steam is passed through the formed filter cake and condensation of the steam releases heat to lower the viscosity of the water or other liquid contained in the filter cake.

Tests have established that the viscosity of water falls from, for example, 1.31 to 0.28 centipoises when the temperature of the water increases from 10° to about 100° centigrade. Such reduction in viscosity brings about better draining efficiency and a considerable lowering of the residual water content of the filter cake.

It has also been recognized in the art that to optimize thermal efficiency, of steam dewatering processes, on rotary drum and rotary disc filters, the proper location of the condensation point of the steam is within the filter cake and preferably immediately adjacent the surface of the filter media and the cake. Notwithstanding such teachings of the prior art apparatus for steam drying filter cake on rotary drum and rotary disc vacuum filters have not operated at optimum efficiencies as the systems lack the necessary structures for properly introducing steam into the dome; for providing proper steam seals between the rotary filter element, the dome and the slurry to be filtered; and the like.

OBJECTS OF THE INVENTION

It is a primary object of the present invention to provide for steam drying filter cake formed on a drum or disc rotary vacuum filter including means for minimizing steam losses and maintaining the condensation front in the zone of the filter medium, which zone would include the interface between the filter cake and the filter medium and also the filter medium.

It is also an object of the invention to provide such rotary vacuum filters including a slurry tank and a steam dome or hood provided with seals to minimize steam losses.

A further object is to provide such apparatus including an improved shape of the steam dome and improved means for substantially uniformly directing steam into the dome without deleterious effects to the formed and still moist filter cake.

Another object is to provide a filter which may be operated such that there is substantially no condensation of steam within the hood and no dilution of the steam by air.

A further object of the present invention is to provide means whereby if the formed filter cake is above a predetermined thickness certain of the steam sealing means move to an inoperative position and the apparatus is stopped or an alarm is sounded or both.

Another object of the present invention is to provide such apparatus including means adapted to receive filter cake formed and dried on the vacuum filter and to obtain further drying by directing ambient air therethrough in an improved cooling apparatus.

These and other objects and advantages of the invention are provided in, for example, a pressure differential filter of the type having a tank for holding a feed material to be filtered; means for introducing a slurry to be filtered into the tank; a filter element mounted for rotation in the tank; means for rotating the filter element to continuously pass portions of the filter element through the slurry in the tank; a hood or cover for the tank enclosing a portion of the filter element above the tank; the improvement comprising means for introducing steam into said hood above the filter element in a direction away from the formed cake in plural paths extending across the hood; further the invention includes releasable seals between the filter element and the hood to retain maximum steam within the hood; and the invention also includes an improved cooler for formed and filter dried filter cake whereby the heat within the filter cake is utilized to further reduce the moisture content of the filter cake.

The invention will be more particularly described in reference to the accompanying drawing wherein.

The invention will be described in detail in respect to a rotary disc type filter; however, it will be recognized that the invention is adapted to the use of a filter drum in place of the plural filter discs.

Referring to the drawing and in particularly to FIGS. 1 through 6 thereof, 10 generally designates a rotary disc type vacuum filter including a central shaft 12 which supports a plurality of conventional filter discs 14 of the type shown in, for example, U.S. Pat. No. 2,781,133 – R. B. Thompson. The filter 10 includes a tank or trough portion 16 and a steam dome or hood 18. Each of the discs of the disc filter is connected via a conventional filter valve 20 to a source of vacuum via a filter cake form receiver generally designated 22. The steam dome or hood 18 is supplied with superheated steam from a source generally designated 26 via automatic control valve 28 and valved conduits 30, 32 and 34 which discharge the steam in a controlled pattern adjacent the inner surface of the top of the dome as to be more fully described herein.

Figure 1:
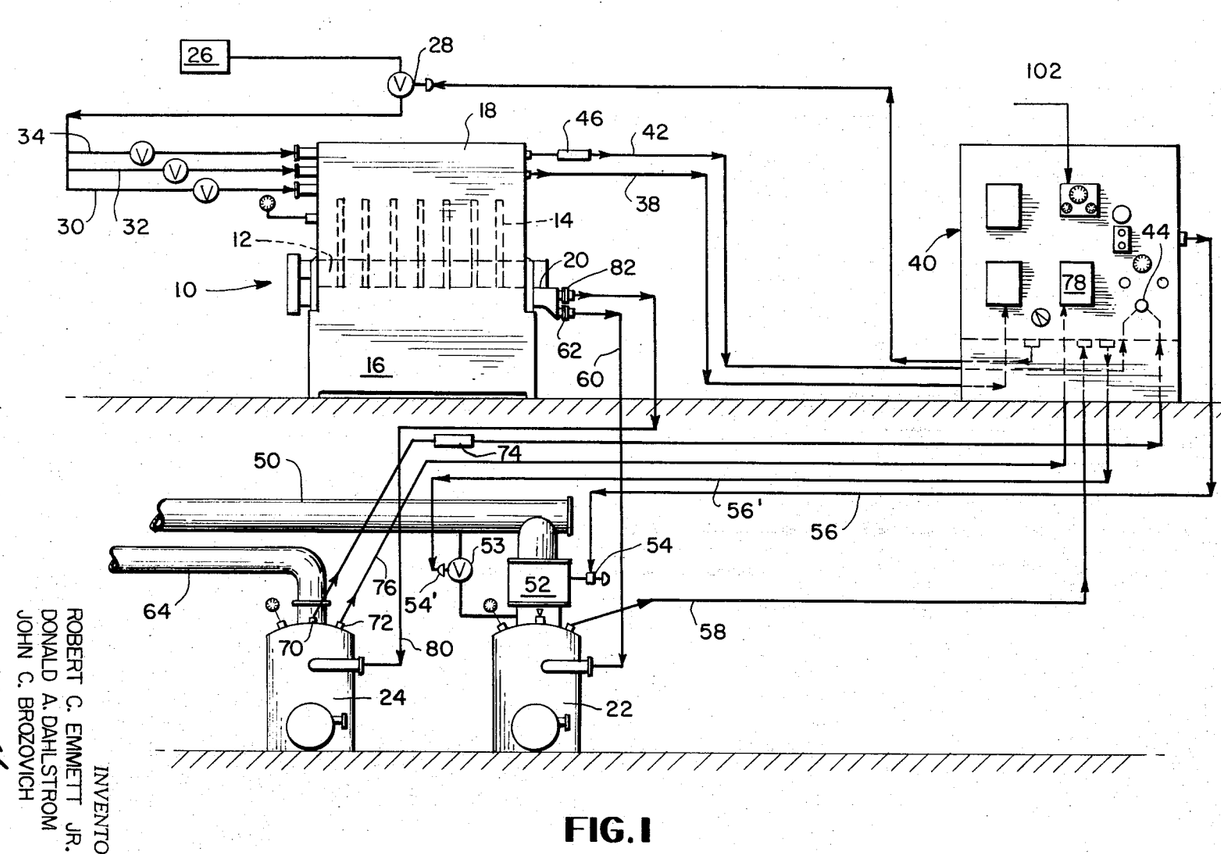
FIG. 1 is a schematic diagram of a system including the apparatus of the present invention.

Remote temperature sensing is provided via line 38 which is connected to the control panel generally designated 40. Further, a position sensor for the releasable seals for each disc of the filter is connected to an alarm line 42 which in turn is connected to an alarm 44 on the panel and a further switch 46 adjacent the filter 10 as to be more fully described hereinafter.

The filter cake form receiver 22 is connected to a vacuum pump or other source of reduced pressure via conduit 50. The conduit 50 is joined to the form receiver 22 via a large control valve 52 and a small control valve 53 which are provided with electrically or pneumatic controlled actuators 54 and 54', which actuators are connected to the control station 40 via lines 56 and 56'. In general, the large control valve 52 is employed only during filter startup and thereafter the large control valve is closed and vacuum is drawn on the form receiver 22 via small control valve 53. Further, substantially all automatic adjustments in the vacuum apply to form receiver 22 are obtained through small control valve 53.

The pressure within the form receiver 22 is constantly sensed and the sense pressure is relayed to the control station 40 via conduit 58. As hereinbefore set forth the form receiver 22 is connected to the filter valve 20 via filtrate conduit 60 and valve coupling 62, whereby only the zones of the filter discs 14 below the level of the slurry in tank 16 are connected to vacuum via the form receiver 22.

The drying cycle vacuum receiver 24 is independently connected to a source of reduced pressure via conduit 64. The receiver is also provided with a pair of temperature sensors 70 and 72. Sensor 70 is connected via switch 74 to the control panel 40 and the switch 46. Sensor 72 is connected to the control panel or station 40 via line 76 and to the dry receiver temperature recorder 78.

The filter valve 20 is connected to the dry receiver 24 via conduit 80 and valve coupling 82 whereby the filter sectors of the discs 14 are only connected to the receiver 24 during that portion of their rotary cycle when the cake is being dried and steam is passing through the formed filter cake.

Figures 2, 3:
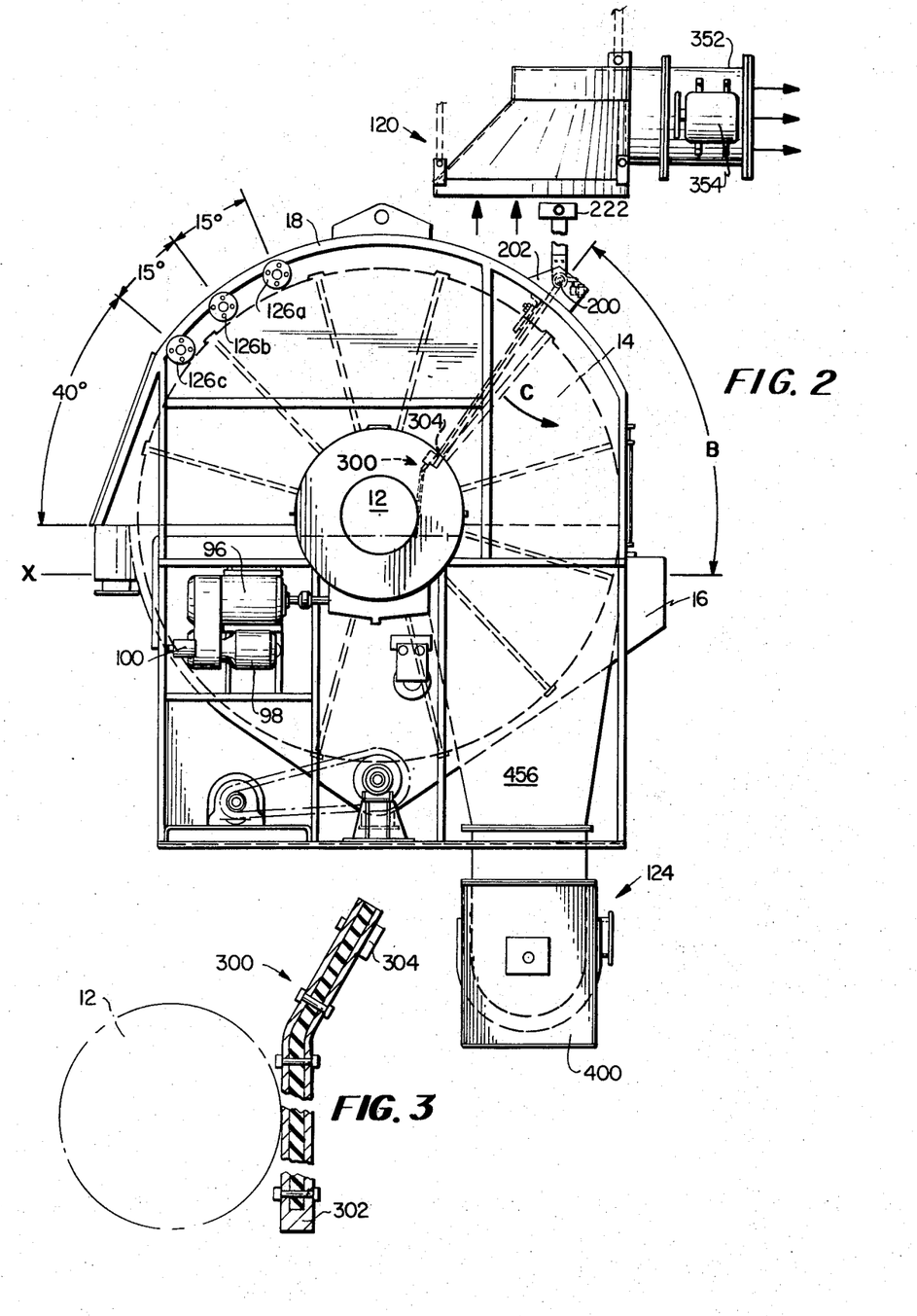
FIG. 2 is an end elevational view of the improved filter and final filter cake drier.
FIG. 3 is an enlarged detailed view of one of the internal seals for the apparatus shown in the drawings.

Referring to FIG. 2 of the drawing, the shaft carrying the plural discs of the disc filter is provided with a large worm gear which is driven by, for example, a worm connected through a gear box 96 to an electric motor 98. The electric motor is of the variable speed type and a controller 100 for the electric motor 98 is provided and connected to the control panel 40 via line 102, FIG. 1 of the drawing, to maintain the liquid level in the tank constant, alternatively if the discs are to be rotated at a constant speed the feed for the tank may be through the float control valve and a surge tank or the like.

Figure 17:
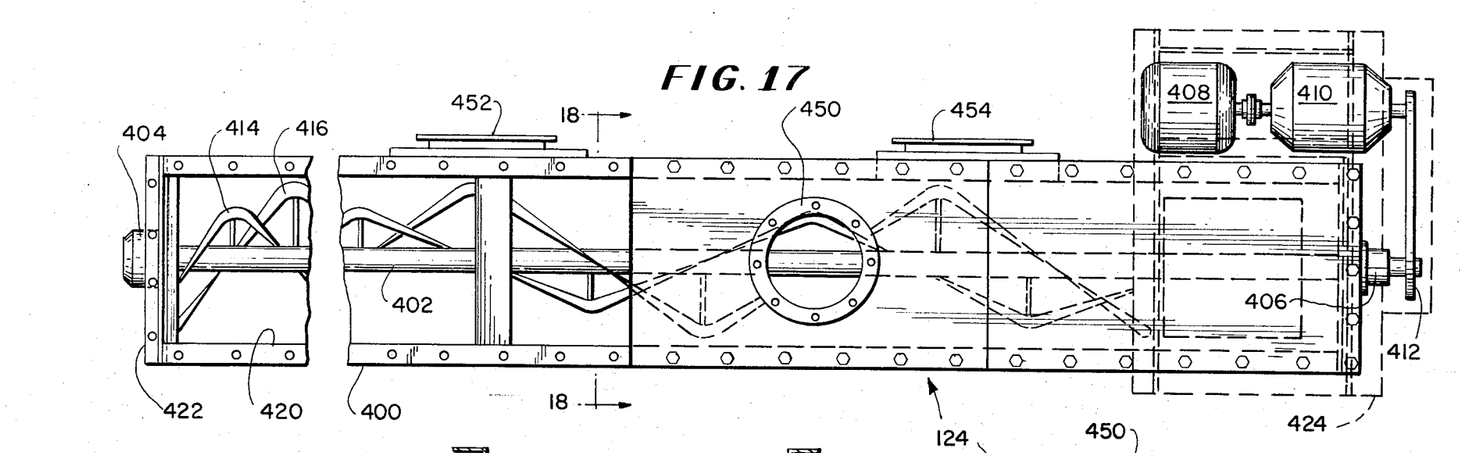
FIG. 17 is a top plan view of the final drying section and adiabatic cooler for the filter of the invention.
Figure 18:
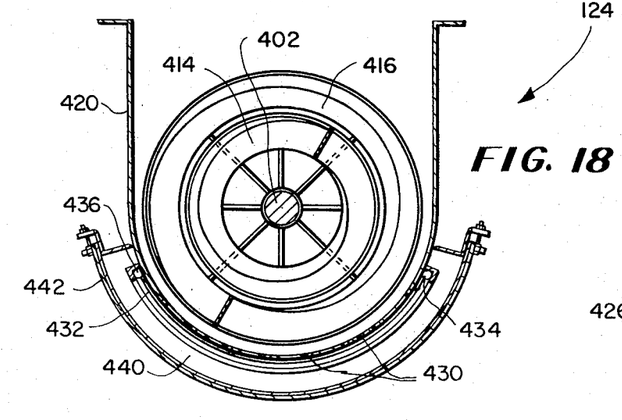
FIG. 18 is a section substantially on line 18—18 of FIG. 17.
Figure 19:
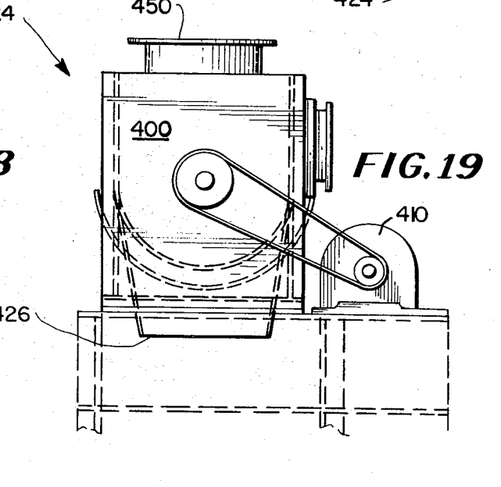
FIG. 19 is an elevational view of the structure shown in FIG. 17.

The general assembly also includes an exhaust hood generally designated 120 for removing, from the environment, steam which is lost from the hood notwithstanding the plural seals to be hereinafter described. Further, the assembly includes an adiabatic cooler and moisture removing means 124 to be described in reference to FIGS. 17, 18 and 19.

Each of the primary elements of the assembly will be described in detail in the following portion of the specification.

STEAM DISTRIBUTION SYSTEM

Figure 14:
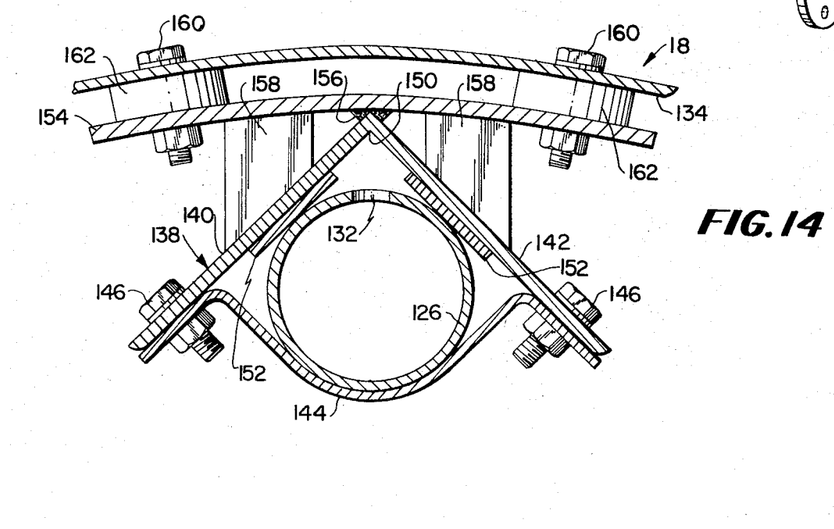
FIG. 14 is a section on line 14—14 of FIG. 16 illustrating the improved steam distribution means for the filter.
Figure 15:
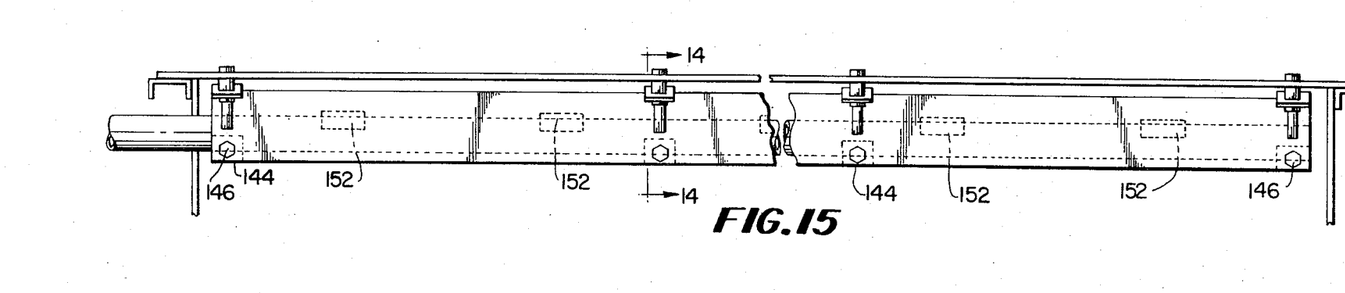
FIG. 15 is a longitudinal view of the structures shown in FIG. 14.
Figure 16:
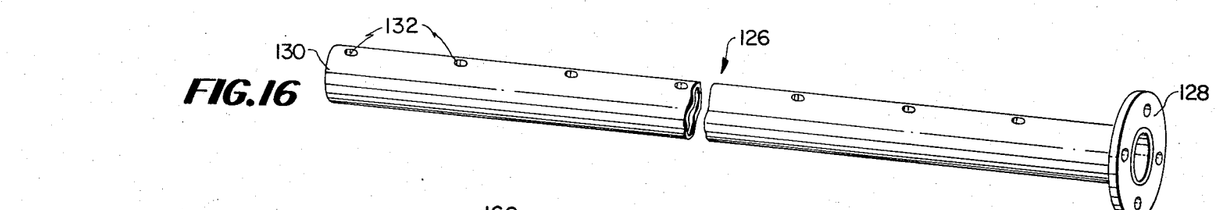
FIG. 16 is a fragmentary perspective view of one of the distribution pipes employed in the structure shown in FIGS. 14 and 15.

Referring in particular to FIGS. 2, 5, 14, 15 and 16, steam conduits 30, 32 and 34 are connected respectively to steam distribution conduits 126a, b and c via flange type coupling 128a, b and c. Each of the distribution conduits 126a, b and c, hereinafter referred to as conduits 126, comprises an elongated tube having a flange at one end as shown in FIG. 16 and being closed at the most inward end 130. Each pipe or tube is provided with a plurality of spaced longitudinally extending steam exhaust ports 132. The pipes 126 are positioned within the steam dome or hood 18 such that the outlet openings 132 are directed toward the upper surface 134 of the hood as more clearly shown in FIG. 14. Each of the steam distribution conduits 126 is mounted in an L-shaped angle iron 138 having leg portions 140 and 142 and pipes 126 are held within the angle bar 138 via a plurality of holding clamps 144 secured to the extended ends of legs 140 and 142 by conventional bolts 146. The brackets or clamps 144 are spaced generally along the length of the angle bar as shown in FIG. 15. Further, it will be noted from FIG. 14 that the openings 132 in the conduit 126 are oriented in alignment with the apex 150 of the angle bar 138 and further the assembly includes a plurality of discontinuous spacer members 152. The spacer members 152 permit steam, issuing from openings 132, after impinging adjacent the apex 150 to be turned and to flow about the pipe and about the inner surfaces of legs 140 and 142 and thereafter to be directed toward the filter cake formed on the filter element without washing the cake or being non-uniformly directed into the steam dome. The apex 150 of each of the angle bars is welded to a plurality of support bars 154 and the support bars and the angle bars are further stabilized by pairs of brace elements 158 which engage the inner curve surface of the bars 154 and the sloping outer faces of the legs 140 and 142. Final assembly is provided by a plurality of bolts 160 which pass through the outer surface of the steam hood 18, through brackets 154 and through small spacers 162 which spacers maintain the assemblies slightly away from the inner surface of the steam dome and allow for expansion and contraction caused by the hot steam flowing through the distribution conduits 126.

It will be apparent that the total area of the plurality of outlets 132 must be less than the cross-sectional area of the conduit 130 so that steam will issue substantially uniformly from each of the outlets 132. Further, it will be apparent that the area blocked by members 152 must be less than the total cross-sectional area of outlets 132 to prevent undue back pressure on the steam flow to the filter dome or hood.

Tests have established that the best position for the steam distribution conduits 126 is at the beginning of the drying cycle with pipe 126c positioned about 40° from a horizontal plane passing through the center of the shaft carrying the discs and with pipes 126c and 126a being spaced from each other by about 15° whereby all of the steam enters the dome in the first approximately 75° of rotation of the discs out of the slurry. This relationship is shown on FIG. 2 of the drawing wherein line X indicates the approximate desired level of the slurry within the tank 16.

STEAM SEALS

In order to reduce to a minimum steam losses and to improve the thermal efficiency of the apparatus, seals are provided between the surface of the slurry to be filtered and the cake removal zone. This zone is generally indicated by the arc B shown on FIG. 2 of the drawing. In order to provide for sealing within this zone seals are required about a forward section of the shaft carrying the rotating discs, about each of the discs and between each end disc and the walls of the tank or hood above the surface of the slurry to be filtered. One of the problems encountered in providing seals for such rotating discs is that the seals must fit about a formed filter cake, which even under ideal operating conditions will vary in thickness and while portions of the seals are resilient means must be provided to prevent damage to the seals and to the individual filter discs in the event cake formation become greater than the tolerances permitted by the resilient seals. The problems encountered were effectively overcome by mounting the primary seals for each filter disc on a cross shaft so that upon overload conditions the seals would swing outwardly on the cross shaft and at the same time actuate an alarm and or stop rotation of the shaft carrying the filter discs. Further, drag means were incorporated in the system which would retain the releasable seals in their operative position until a predetermined drag is encountered. The improved seals will be described in detail in reference to FIGS. 2, 4, and 6 through 13.

Figure 4:
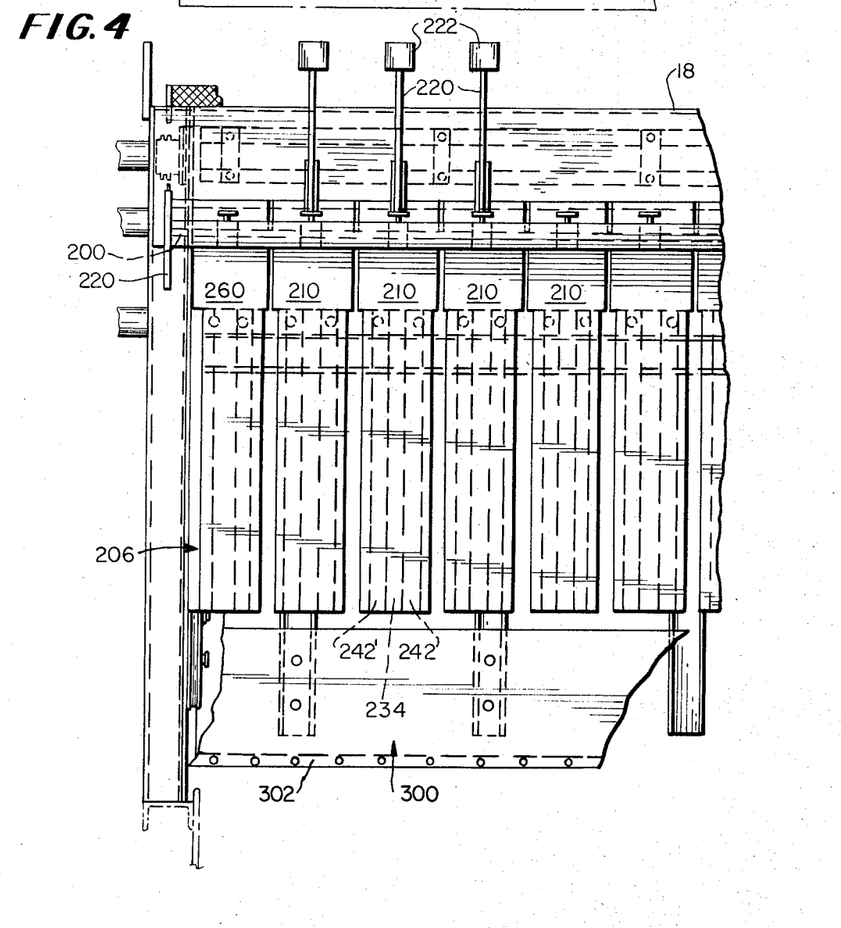
FIG. 4 is an enlarged fragmentary front elevational view of a portion of the filter shown in FIG. 2.
Figure 5:
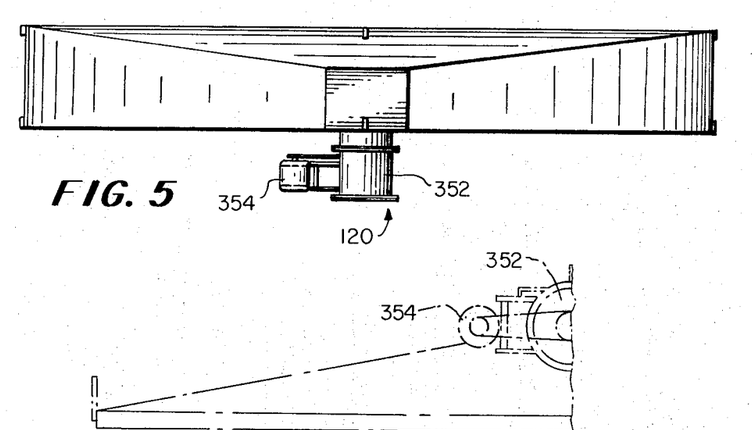
FIG. 5 is a top plan view of the hood shown in FIGS. 2 and 4.

Across the front of the hood is mounted a shaft 200 between a pair of weldments 202, FIGS. 2 and 4 of the drawing. Strung for pivotal movement on the shaft 200 are a plurality of sealing structures generally designated 204 and 206. Each of the plural discs 14, other than the pair of end discs, is provided with the swingable seals 204 and each of the end disc is provided with one of the swingable seals 206.

Each of the seals 204 consist of a plate portion 210 having secured at the upper ends a cylindrical element 212 through which passes the shaft 200. Centrally secured to the tubular portions 212 are a pair of ears 214 and 214' bored as at 216 and arcuately slotted as at 218. The bore 216 and the slot 218 provide adjustable mounting means for a rod 220 having secured at its upper end a mass or weight 222. Further, each of the tubular portions 212 is provided with an actuating peg or lever arm 224, which lever arm is employed in conjunction with a microswitch 228 carried by a cross bar 230 whereby movement of the assembly 204 releases switch actuator 232 stopping the actuation of the filter and/or counting an alarm such as alarm 46, FIG. 1 of the drawing.

In the zone of rotation of each of the discs 14 the seals include a body portion 234 provided with wings 236 and 236'. The wings 236 and 236' are bored as at 238 to receive fastening means 240 for securing resilient rubber or plastic sealing elements 242 and 242' thereto as more clearly shown, for example, in the section illustrated in FIG. 10.

Figures 7, 8, 11, 12, 13:
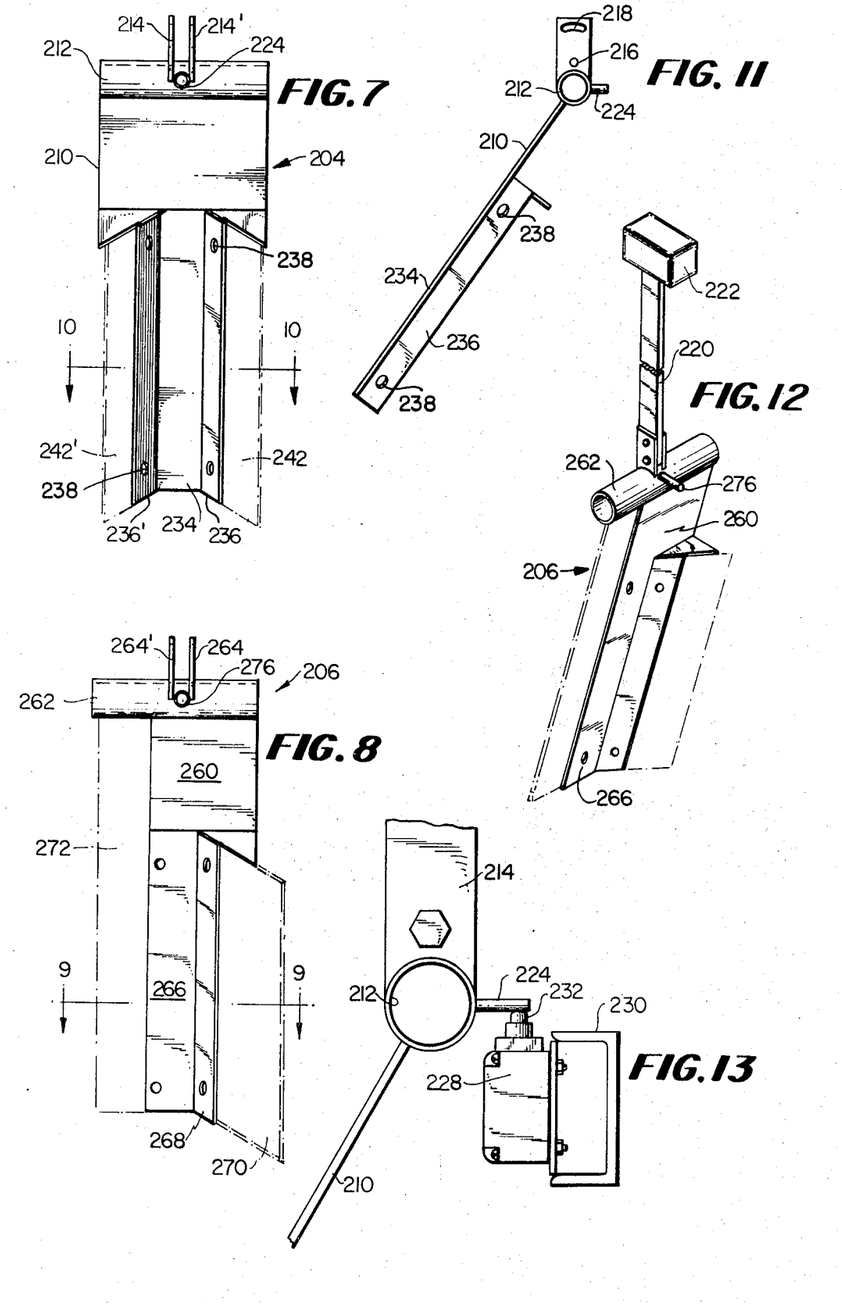
FIG. 7 is a front elevational view of one of the releasable seals for the filter.
FIG. 8 is a front elevational view of an end seal for the filter.
FIG. 11 is a side elevational view of the structures shown in FIG. 7.
FIG. 12 is a perspective view of the end seal shown in FIG. 8 with one of the releasing weight means shown in the attached position.
FIG. 13 is an enlarged fragmentary detail view of a portion of an alarm system associated with the releasable seal.
Figure 9:
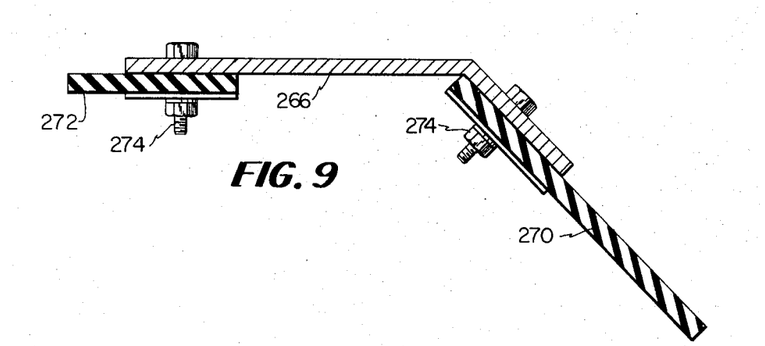
FIG. 9 is a section on line 9—9 of FIG. 8.
Figure 10:
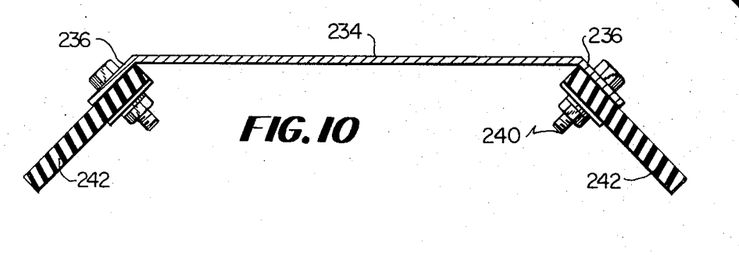
FIG. 10 is a section on line 10—10 of FIG. 7.

The pair of outside discs which rotate adjacent the two end walls of the filter employ releasable seals of the type shown in FIGS. 8, 9 and 12; there being a left-hand element as illustrated and a mirror image form for the opposite end not specifically shown in the drawing. Each of the releasable seals for the outside faces of the end disc generally comprise a plate member 260 carrying at its upper end a tubular sleeve 262 which sleeve receives the cross shaft 200 in the manner described in reference to releasable seal 204. Further, each of the end seals 206 includes a pair of ears or bosses 264 and 264' bored as in the same manner as ears 214 to receive the shaft 220 of a counterweight as illustrated in FIG. 12.

The lower end of the plate 260 has integrally formed therewith a plate 266 having an offset edge portion 268 to which is attached a resilient sealing web 270. The opposite edge of plate 266 has secured thereto a further resilient web 272, as more clearly shown in FIG. 9 of the drawing. Webs 270 and 272 are secured to the plate 266 by bolt assemblies 274.

Releasable sealing members 206 also are provided with switch actuating pins 276 which contact individual alarm switches such as switch 228, shown in FIG. 13.

In order to provide a seal for the rotating shaft and to provide means for releasably securing the releasable seals 204 and 206 in their sealing position, as shown in FIG. 2 of the drawing, a sealing blanket generally designated 300 is mounted on brackets extending from the lower portion of the tank 16, which sealing blanket is provided with an extended weight element or mass 302 which dips into the slurry maintained in the tank 16. The blanket element 300 carries along its upper edge a plurality of individual permanent magnets 304 — FIGS. 2 and 3, which permanent magnets engage the flat plate portions 234 and 266 of seal members 204 and 206, respectively, and hold the seals in their sealing relationship with seal 300 until torque applied by an oversize filter cake to one of the releasable seals 204 and 206 overcomes the pull of its magnet 304 urging the lower end of the released seal generally in the direction of the directional arrow C about pivot shaft 200. Once the movement of a seal has started the weight element 222 carried by weight arm 220 swings the seal out of engagement with the respective disc of the disc filter and in so moving one of the alarms switches 228 is energized shutting off power to the filter or sounding an alarm or both so that the operator may correct the malfunctioning of the filter causing an enlarged cake formation.

HOOD STRUCTURE

Notwithstanding the use of seals 204, 206 and 300 some steam will escape about the filter discs from the hood 18 and this steam is preferably withdrawn from the environment of the filter by a hood structure 120. The upper portion of the hood is provided with a fan 352 driven by a suitable electric motor 354 which removes steam and possibly odors from the area of the filter and suitable ducting may vent the hood through an outer wall of the plant.

FILTER CAKE FINAL DRIER

Figure 6:
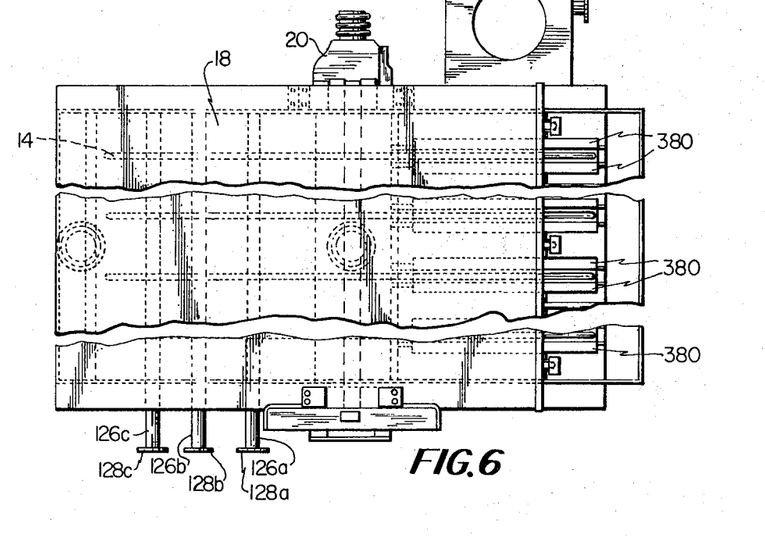
FIG. 6 is a top plan view of the filter of the invention.

Associated with each of the discs and maintained between the seals 204 and 206 and the zone where the discs re-enter the slurry in tank 16 are filter cake scrapers generally designated 380, as more clearly shown in FIG. 6 of the drawing. The scraper assemblies 380 are of conventional design and remove the formed and dried filter cake from the disc sectors. The filter cake as removed by the scrapers is deposited in an adiabatic final drier for the filter cake generally designated 124. Referring particularly to FIGS. 2, 17, 18 and 19, the adiabatic drier comprises an elongated trough 400. Extending from end to end thereof is a shaft 402 journalled in bearings 404 and 406 at opposite ends of the trough 400. The shaft 402 is suitably driven by motor 408, the reducer or gear box 410 and belt 412.

The shaft 402 carries a pair of screw flight conveyors 414 and 416. The flights 414 and 416 are of opposite pitch with the larger diameter flight 416 pitched such that material placed in the hopper 420 moves from end 422 to the discharge end 424 having discharge outlet 426.

The smaller diameter flight 414 is pitched in the opposite direction and moves material from the discharge end 424 toward the inlet end 422 but at a lesser rate so that the net transfer of material is from end 422 to end 424. By employing the pair of oppositely pitched flights having different diameters material dropped into the trough 400 via the inlet 420 is thoroughly mixed and uniformly distributed throughout the trough 400 so that a uniform depth of bed is maintained.

The bottom portion of the wall 430 of the trough 400 is provided with a plurality of perforations and a filter cloth 432 or the like is stretched about the performations in the bottom 430 and maintained therein by retainer rods 434 and 436. The filter cloth prevents the passage of fine filter cake into the air passage 440 and to function as an air diffuser or pressure equalizer. A blower, not shown in the drawing, is connected to the air passage 440 formed by the inner perforate wall 430 of the trough 400 and the arcuate external wall 442 whereby air is continuously blown through the filter media, the perforations in bottom 430 up through the hot filter cake being stirred and conveyed by serew flights 414 and 416 removing additional moisture from the hot filter cake. The moisture and the air passing through the filter cake exits from the device via outlet 450 which preferably is connected to suitable ducting and exhaust fan means to reduce back pressure on the system.

Inspection and clean out openings 452 and 454 are provided in one of the side walls of trough 400 and as more clearly shown in FIG. 2 the inlet opening 420 of the adiabatic cooler is connected to suitable chute means 456 so that material removed from each of the rotating discs of the disc filter falls into the chute 456, thence into the cooler where heat and moisture are removed from the cake prior to discharge of the now dried filter cake from the outlet opening 426 to be disposed of or utilized, as the case may be. Where desired, chute means 456 may include suitable conveyors for transporting the filter cake to a more remote cooler or the like. It will also be apparent that other forms of final driers may be employed with the improved filter of the invention. For example, perforated belt, shaker, vibrator, or drag belt conveyors having means for directing a stream of air over the conveyed material may be employed as the final drier. Further, very satisfactory results have been obtained using a cascade type of drier with air flowing through a plurality of curtains of filter cake at each cascade.

From the foregoing description taken in view of the illustrated embodiments of the present invention, it will be recognized by those skilled in the art that an effective apparatus for forming and steam drying filter cake has been provided. It will also be recognized that various modifications in the structures described and shown may be made without departing from the concepts disclosed herein. For example, as hereinbefore set forth, the invention has equal utility in conjunction with a rotary drum pressure differential filter. Further, the releasable seals which are urged into the released position, by an oversized filter cake in conjunction with the weight arms and which releasable seals are releasably held in their active position by the permanent magnets shown and described herein, may be connected to a shaft such that upon rotation of the shaft all of the releasable seals would swing out of engagement with the rotating discs of the filter. In such case mechanical or electrical or electromechanical sensing means may be employed to actuate the motor for rotating the shaft.

The sensor may be of the feeler type or if desired the oversized filter cake could be sensed by a light beam in conjunction with a photoconductive cell. It will also be recognized that where each of the releasable seals is individually mounted on the cross-shaft 200, as disclosed herein, the seals may be maintained in their active position by a releasable spring clip rather than the permanent magnet.

It will also be appreciated that while the filter shown and described herein includes a final adiabatic dryer many of the objects and advantages described herein would be accomplished without the final dryer depending upon the desired final moisture content of the particular filter cake to be formed on the apparatus.

We claim:

1. In a pressure differential filter of the type having a tank for holding a feed material to be filtered; means for introducing a slurry to be filtered into the tank; a filter element mounted for rotation in the tank; means for rotating the filter element to continuously pass portions of the filter element through the slurry in the tank thence through filter cake drying and filter cake removal zones; a hood for the tank enclosing a portion of the filter element above the tank; means for introducing steam into said hood; the improvement comprising releasable seal means extending from a forward edge of the steam hood to a zone approximate the slurry in the tank to reduce to a minimum the escape of steam from the hood in the filter cake removal zone of the apparatus.

2. The invention defined in claim 1 including plural filter elements wherein each filter element has associated therewith an individual releasable steam seal.

3. The invention defined in claim 2 including switch means, and means associated with each of the releasable seals for actuating said switch means to de-energize the filter upon release of one or more of the releasable seals.

4. The invention defined in claim 1 including permanent magnets releasably maintaining the releasable seals in their sealing relationship to the filter element.

5. The invention defined in claim 2 including a plurality of distribution conduits extending across the hood between the inner surface thereof and the path of rotation of the filter element to provide the plural paths for the introduction of steam; each of said conduits including a plurality of steam outlet openings directed towards the upper surface of the hood.

6. The invention defined in claim 5 including steam flow deflector means carried by each of the steam distribution conduits to redirect the steam entering the hood toward the filter element.

7. The invention defined in claim 1 wherein the means for introducing steam into said hood are arranged in the first about 75° of rotation of the filter element out of the slurry to be filtered.

8. In a pressure differential filter of the type having a tank for holding a feed material to be filtered; means for introducing a slurry to be filtered into the tank; a filter element mounted for rotation in the tank; means for rotating the filter element to continuously pass portions of the filter element through the slurry in the tank; the improvement comprising a steam dome connected to the tank; said steam dome being generally hemicylindrical in shape and sized to permit the free passage of the filter element therethrough during the drying portion of the filtration cycle; and means for introducing steam into the steam dome during not more than the first about 75° of passage of the filter element through said steam dome, including sealing means associated with the dome and the filter element restricting the passage of steam from the dome in the drying portion of the cycle.

9. The invention defined in claim 8 including an exhaust hood positioned over the steam dome adjacent the zone where the filter cake is removed from the filtered element.

10. The invention defined in claim 8 including a plurality of longitudinally extending steam distribution conduits carried by said steam dome.

11. The invention defined in claim 8 further including means for directing filter cake removed from the filter element to further drying means.

12. The invention defined in claim 11 wherein said further drying means comprises conveyor means for directing the removed filter cake along a generally horizontal path and means for directing a flow of ambient air through the filter cake in said elongated path.

13. The invention defined in claim 12 wherein the conveying means for the filter cake includes a first screw flight conveyor having a flight pitched to move the filter cake in one direction and a second screw flight conveyor having a diameter less than the diameter of the first conveyor with the pitch of said second conveyor being such as to move the filter cake in the opposite direction to movement of the filter cake by said first conveyor.

14. The invention defined in claim 11 wherein the final drier comprises an elongated trough; a perforated bottom for said trough; at least one screw conveyor mounted in said trough; and means for directing a flow of ambient air through the perforations in the bottom of the trough.

* * * * *